United States Patent [19]

Kobayashi

[11] Patent Number: 5,215,161
[45] Date of Patent: Jun. 1, 1993

[54] POWER TRANSMISSION SYSTEM FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 847,431

[22] Filed: Mar. 6, 1992

Related U.S. Application Data

[63] Continuation of Ser. No. 576,123, Aug. 24, 1990, abandoned, which is a continuation of Ser. No. 300,104, Jan. 18, 1989, abandoned.

[30] Foreign Application Priority Data

Feb. 16, 1988 [JP] Japan ................... 63-033198

[51] Int. Cl.$^5$ .................................. B60K 17/35
[52] U.S. Cl. ........................ 180/248; 74/650; 475/295
[58] Field of Search ............ 180/247, 248, 249, 250; 74/650; 475/269, 295

[56] References Cited

U.S. PATENT DOCUMENTS

| | | | |
|---|---|---|---|
| 3,963,085 | 6/1976 | Vinton | 180/250 |
| 4,103,753 | 8/1978 | Holdeman | 475/295 |
| 4,484,654 | 11/1984 | Hayakawa | 180/248 |
| 4,628,770 | 12/1986 | Kodama et al. | 475/295 |
| 4,677,875 | 7/1987 | Batchelor | 180/248 |
| 4,714,129 | 12/1987 | Mueller | 180/247 |
| 4,781,266 | 11/1988 | Hotta et al. | 180/248 |
| 4,787,269 | 11/1988 | Matsumoto | 180/247 |
| 4,804,061 | 2/1989 | Kameda | 180/247 |
| 4,836,322 | 6/1989 | Sakakiyama | 180/247 |
| 4,896,738 | 1/1990 | Kodama | 180/247 |

FOREIGN PATENT DOCUMENTS 62-23823 1/1987 Japan .
62-143720 6/1987 Japan .

*Primary Examiner*—Margaret A. Focarino
*Assistant Examiner*—Anne Marie Boehler
*Attorney, Agent, or Firm*—Martin A. Farber

[57] ABSTRACT

A transfer device is provided for distributing the output of a transmission to front wheels and rear wheels of the vehicle through a front power train and a rear power train. The output shaft of the transmission is operatively connected to the rear power train. The transfer device has a drive gear rotatably mounted on an output shaft of the transmission and engaged with a driven gear in the front power train, a fluid operated multiple-disk friction clutch having a drive drum and a driven drum. The driven drum is secured to the drive gear and the drive drum is secured to the output shaft. The output shaft of the transmission and the drive gear are arranged to be changed with an output shaft and a drive gear for the front power train which are engaged with each other, and an input member of the rear power train is arranged to be secured to the drive drum. Thus, the power transmitting system can be changed from the front-wheel drive based four-wheel drive system to the rear-wheel drive based four-wheel drive system.

4 Claims, 4 Drawing Sheets

ND DRIVE MOTOR VEHICLE

POWER TRANSMISSION SYSTEM FOR A FOUR-WHEEL DRIVE MOTOR VEHICLE

RELATED APPLICATION

This application is a continuation of my co-pending application Ser. No. 07/576,123, filed Aug. 24, 1990 (now abandoned), which in turn is a continuation of my previously co-pending application Ser. No. 07/300,104 filed Jan. 18, 1989 (now abandoned).

BACKGROUND OF THE INVENTION

The present invention relates to a power transmission system for a four-wheel drive motor vehicle, and more particularly to a system having a fluid operated multiple-disk friction clutch. This type of clutch is employed in a transfer device for distributing the output torque of a transmission to auxiliary drive wheels.

In such a vehicle, the power transmission system can be converted from a two-wheel drive system to a four-wheel drive system by engaging the clutch.

In the four-wheel drive vehicle, there are several layouts of the engine and power trains, such ar a front-mounted engine with front-wheel drive layout, a front-mounted engine with rear-wheel drive layout, and a rear-mounted engine with rear-wheel drive layout.

Since distribution between the front axle load and the rear axle load is varied in accordance with the engine an power train layout of the four-wheel drive motor vehicle, it is desirable to design the torque transmission system in accordance with the distribution of axle load.

In the layout where the engine and the transmission are mounted on a front portion of the vehicle, the distribution cf the front axle load is larger than the rear axle load. However, the rear axle load becomes large in some layouts.

It is desired that the engine power is directly transmitted to the front wheels or the rear wheels in accordance with the layout of the drive line and the distribution of the axle load of the four-wheel drive motor vehicle, thereby improving driveability, driving stability and fuel consumption.

Japanese Patent Application Laid-Open 62-143720 discloses a four-wheel drive motor vehicle having a front-mounted engine with rear-wheel drive layout where a transmission output shaft is connected to rear drive wheels and a fluid operated friction clutch is provided on the output shaft. The engine power from the clutch is transmitted to the front wheels of the vehicle through a pair of gears, a shaft provided outside the transmission and a front differential.

Japanese Patent Application Laid-Open 62-23823 discloses a four-wheel drive motor vehicle in which the engine power is derived from a fluid operated friction clutch provided on a transmission output shaft through sprocket wheels and chains.

Since, in the former prior art, the four-wheel drive motor vehicle having the front-mounted engine with rear-wheel drive layout is constructed on the basis of the two-wheel drive motor vehicle having the front-mounted engine with rear wheel drive layout, it is difficult to alter the system to a front-wheel drive four-wheel system.

In the latter four-wheel drive motor vehicle, if the front-mounted engine with rear-wheel drive layout is altered to the front-mounted engine with front-wheel drive layout, problems arise in structure around the transfer clutch, hydraulic circuit for the clutch, structure of bearings, and extension of the case in the axial direction. These problems obstruct the alteration of the layout.

SUMMARY OF THE INVENTION

The object of the present invention is to provide a power transmission system for a four-wheel drive motor vehicle in which a transfer system can be easily altered between the front-wheel drive based four-wheel drive system and the rear-wheel drive based four-wheel drive system.

According to the present invention, there is provided a power transmission system for a four-wheel drive motor vehicle having a transmission for transmitting power of an engine, a transfer device for distributing the output from an output shaft of the transmission to front wheels and rear wheels, a front power train for transmitting the output of the transfer device to the front wheels, and a rear power train for transmitting the output of the transfer device to the rear wheels.

The transfer device comprises a drive gear rotatably mounted on the output shaft of the transmission and engaged with a driven gear in the front power train, a fluid operated clutch having a first drum and a second drum which are engaged with each other by pressure of oil, the first drum being secured to the drive gear and the second drum being secured to a member of the rear power train, the output shaft of the transmission and the drive gear being arranged to be changed with an output shaft and a drive gear which are engaged with each other.

In an aspect of the invention, the transmission is an automatic transmission, and the fluid operated clutch is a fluid operated multiple-disk friction clutch.

The other objects and features of this invention will become understood from the following description with reference to the accompanying drawings.

DETAILED DESCRIPTION OF THE PREFERRED EMBODIMENT

Figure 1A:
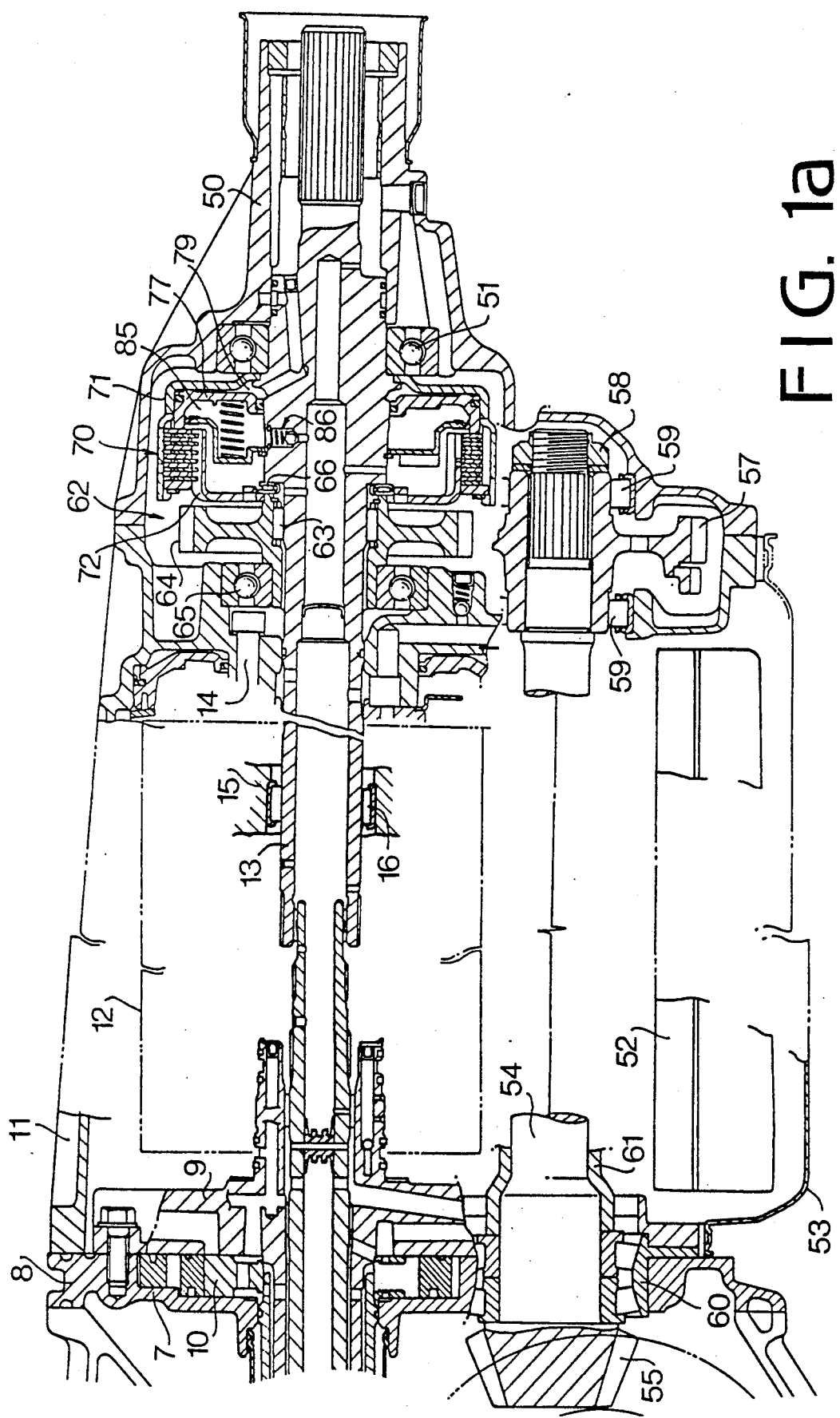
FIGS. 1a and 1b are sectional views showing a power transmission system for a rear-wheel drive based four-wheel drive motor vehicle having a front-mounted engine according to the present invention.
Figure 1B:
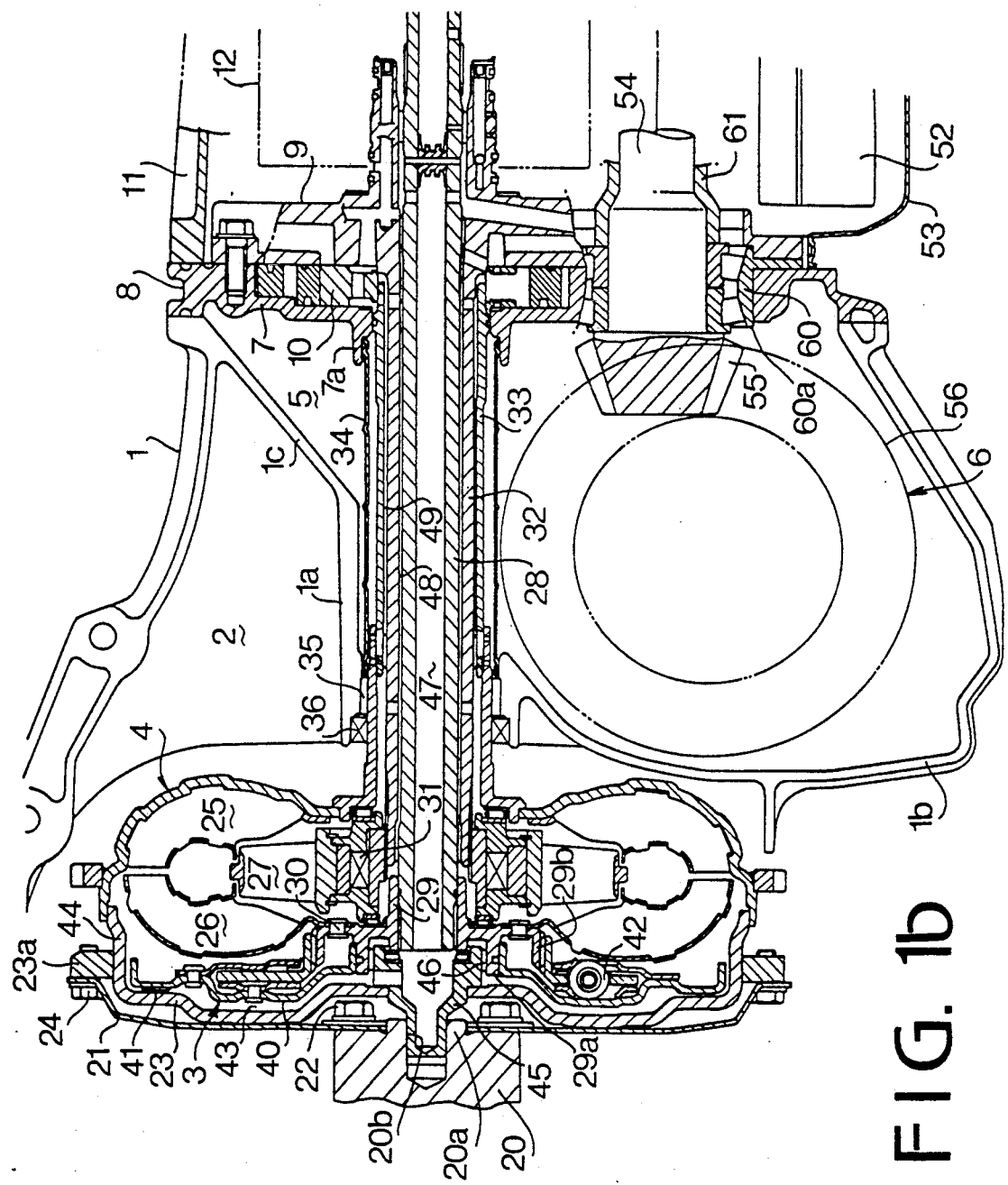

FIGS. 1a and 1b show a power transmission system in a transaxle type for a rear-wheel drive based four-wheel drive motor vehicle having an engine at a front portion thereof. The power transmission system has a differential case 1 made of die casting aluminum, a torque converter 4 with a lockup clutch 3 mounted in a converter box 2, and a differential 6 mounted in a differential box 5 behind the torque converter 4. The differential case 1 has a cylindrical portion 1a, and a lower partition 1b and an inclined partition 1c which define a front side compartment and a rear side compartment. To the rear end of the differential case 1, a shaft supporting plate 8 having a pump housing 7 is attached. An oil pump 10 is housed in the pump housing 7 and a cover 9. A transmission case 11 housing an automatic transmission 12 is attached to the rear of the shaft supporting plate 8.

A crankshaft 20 of the engine has a boss 20a to which a drive plate 21 is fixed by bolts 22. A converter cover 23 is secured to the drive plate 21 by bolts 24 at a flange 23a. The torque converter 4 comprises an impeller 25 made integral with the converter cover 23 by welding, a turbine 26 and a stator 27 connected to a hollow stator shaft 32 through a one-way clutch 31. The turbine 26 is fixed by rivets 30 to a disc having a turbine hub 29 which is splined to an input shaft 28 disposed in the stator shaft 32.

The input shaft 28 extends into the transmission case 11. The stator shaft 32 is integral with the cover 9 of the oil pump 10. A pump drive shaft 33 surrounding the stator shaft 32 is connected to the impeller 25 and is operatively connected with a rotor of the oil pump 10. In order to prevent leakage of automatic transmission fluid and mixing of the fluid with oil for differential gears, a seal pipe 34 for covering the pump drive shaft 33 is further provided. The front end portion of the seal pipe 34 is tightly embedded in the cylindrical portion 1a of the differential case 1 through a bush 35 and sealed by an oil seal 36 to prevent the oil from leaking. The rear end is tightly embedded in a boss 7a of the pump housing 7. The seal pipe 34 collects the oil leaking from the pump drive shaft 33 and from the oil pump 10 to separate the oil for the differential gears from the oil for the automatic transmission.

The lockup clutch 3 of the torque converter 4 has a lockup piston 40 disposed adjacent the converter cover 23. Near the periphery of the lockup piston 40, a facing 41 is attached adjacent the cover 23 for making a contact with the cover 23. A torsion damper 42 is attached to the lockup piston 40 adjacent the turbine 26. A release side oil chamber 43 for applying release pressure to the lockup piston 40 is defined in a front portion of the lockup piston 40. Behind the lockup piston 40, an apply side oil chamber 44 connected to the torque converter 4 is formed for applying lockup pressure to the lockup piston 40.

A hollow pilot boss 45 is engaged with the converter cover 23 and is secured thereto. The pilot boss 45 projects out of the converter cover 23 and is engaged with hole 20b formed in the center of the crankshaft 20.

The turbine boss 29 has an annular inner boss 29a and an annular outer boss 29b. The pilot boss 45 is mounted in the inner boss 29a, interposing a bush 46 so that the turbine 26 is rotatably supported on the pilot boss 45. Slidably mounted on the inner boss 29a is the lockup piston 40. A hub of the torsion damper 42 engages with the outer boss 29b through splines.

The oil in the turbine 26 of the torque converter 4 is further supplied to the apply side chamber 44 to urge the lockup piston 40 toward the converter cover 23. The pressure of oil in the release side chamber 43 is set to a value slightly higher than that of the apply side chamber 44 to disengage the lockup piston 40 from the converter cover 23.

A hydraulic circuit for the torque converter 4 comprises an oil passage 47 formed in the input shaft 28 for the release of the lockup clutch 3. The passage 47 is communicated with the release side oil chamber 43 through the hollow of the pilot boss 45. An oil passage 48 formed between the input shaft 28 and the stator shaft 32 is communicated with the turbine 26 and the apply side oil chamber 44. A drain passage 49 for draining the oil in the impeller 25 is formed between the stator shaft 32 and the pump drive shaft 33.

The automatic transmission 12 has a well known structure and operates to transmit the power of the engine to an output shaft 13 which is disposed at the rear end of the input shaft 28. A front portion of the output shaft 13 is rotatably mounted on a member 15 secured to the transmission case 11 by bolts 14 through a needle bearing 16. The output shaft 13 is further mounted on a bearing 51 provided in an extension case 50 connected to the rear end of the transmission case 11, and operatively connected to a propeller shaft (not shown) to transmit the power of the engine to the rear drive wheels.

Provided under the automatic transmission 12 in the transmission case 11 is an oil pressure control unit 52 above an oil pan 53.

A front drive shaft 54 is disposed between the transmission 12 and the oil pressure control unit 52 in parallel with the input shaft 28. A drive pinion 55 of the front drive shaft 54 engages with a crown gear 56 of the differential 6 to transmit the power of the engine to the front drive wheels. A front end of the front drive shaft 54 is supported on the shaft supporting plate 8 through a bearing 60. A flange 60a of the bearing 60 is clamped to the plate 8 by bolts (not shown) for positioning the shaft. A spacer 61 secured to the shaft 54 is disposed adjacent the bearing 60.

A reduction driven gear 57 is splined to a rear end of the front drive shaft 54 and clamped by a lock nut 58. The driven gear 57 is rotatably supported in the transmission case 11 and the extension case 50 at the hub thereof through roller bearings 59.

Figure 2:
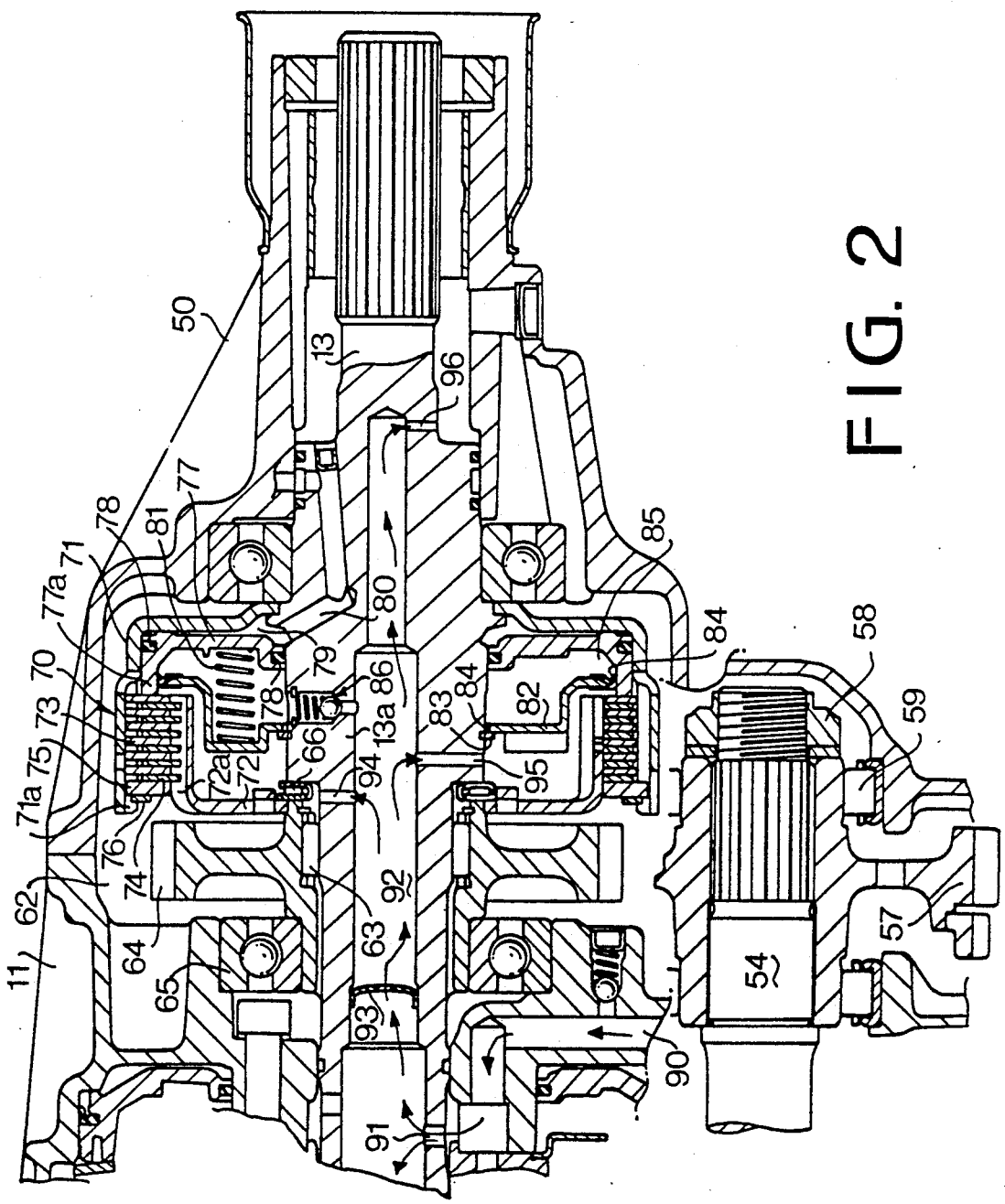
FIG. 2 is an enlarged sectional view showing a part of the system of FIG. 1.

Referring to FIG. 2, a transfer device 62 is provided on the output shaft 13. The transfer device 62 comprises a reduction drive gear 64 mounted on the output shaft 13 through a needle bearing 63 and engaged with driven gear 57, and a transfer clutch 70 disposed between the drive gear 64 and a boss 13a of the output shaft 13. The drive gear 64 is supported in the transmission case 11 through a bearing 65, for sustaining radial load generated by the engagement with driven gear 57 and thrust load generated at deceleration. The drive gear 64 abuts against the boss 13a through a thrust bearing 66 for sustaining thrust load.

The transfer clutch 70 in the form of a fluid operated multiple-disk friction clutch is provided in the extension case 50. The transfer clutch 70 comprises a drive drum 71 secured to the boss 13a of the output shaft 13 as a drive member, a driven drum 72 secured to the reduction drive gear 64 as a driven member, a plurality of disks 73 splined on the drum 71 through splines 71a, and a plurality of disks 74 splined on the drum 72 through splines 72a, alternately arranged. A piston 77 is provided in the drum 71 and slidably mounted on the boss 13a of shaft 13. The piston 77 is slidably engaged with an inner periphery of the drum 71 at an outer flange 77a having an oil seal 78. An end of the outer flange 77a is adapted to engage with the innermost disk 73. An oil chamber 79 is formed between the piston 77 and the drum 71. Oil is supplied to or drained from the chamber 79 through an oil passage 80 formed in the shaft 13.

A cylindrical retainer 82 is disposed in a space between the drive drum 71 and the driven drum 72. The retainer 82 has seal rings 84 integrally formed at an inner periphery and at an outer periphery, respectively. The retainer 82 is mounted on the boss 13a of the output shaft 13 by a snap ring 83 and slidably engaged with an inner periphery of the flange 77a of the piston 77. Thus, the retainer 82 is watertightly mounted between the output shaft 13 and the piston 77, thereby defining a centrifugal oil pressure chamber 85 having a large volume, opposite to the oil chamber 79. A return coil spring 81 is provided in the chamber 85 between the piston 77 and the retainer 82.

A check valve 86 is provided in the boss 13a, for communicating the chamber 85 with an oil passage 92 formed in the shaft 13.

Describing an oil supply system, the lubricating oil cooled in an oil cooler (not shown) is fed to the oil passage 92 through a passage 90 formed in the transmission case 11 and a port 91 formed in the shaft 13. The oil in the passage 92 is fed to a front portion of the transmission, for lubricating each of the parts in the transmission 12 and to the rear portion through an orifice 93 and ports 94 and 95, for lubricating the transfer device, and drained from a port 96. Although the pressure of oil is reduced while flowing, the oil in the passage 92 has a pressure higher than the spring of the check valve 86 so that the oil can be supplied to the chamber 85.

Describing the operation, the engine power is transmitted to the transmission 12 through the input shaft 28 either through the torque converter 4 or through the lockup clutch 3 by controlling the supply of oil to the torque converter. The engine power is transmitted to the output shaft 13 through the transmission and to the rear drive wheels through the propeller shaft.

The oil pressure in the piston chamber 79 of the transfer clutch 70 is increased when the vehicle starts at full depression of an accelerator pedal of the vehicle, uphill climbing or is driven on a rough road. The oil pressure is controlled to be low corresponding to a steering angle when the vehicle makes a turn.

When oil is supplied to the chamber 79, the piston 77 is pushed by the pressure of the oil. The outer flange 77a of the piston pushes the disks 73 and 74 to engage the transfer clutch 70, for producing a clutch torque corresponding to the clutch pressure. Thus, the power of the engine from the output shaft 13 corresponding to the clutch torque is transmitted to the front wheels through the clutch 70, reduction drive gear 64, reduction driven gear 57, front drive shaft 54, and front differential 6, so that a full-time four-wheel driving system is established.

Since the rear wheels are directly connected the output of the transmission 12 to increase the distribution ratio of the torque transmitted to the rear wheels, this structure is appropriate for the motor vehicle having a large rear axle load distribution.

In the system, the lubricating oil from the oil passage 92 is supplied to the transmission 12, various bearings and the transfer clutch 70, and further to the centrifugal oil pressure chamber 85 through the check valve 86.

When the centrifugal force is exerted on the oil in chamber 79, the piston 77 urges the end disk 73. However, the centrifugal force of the oil in the chamber 85 is exerted on the piston 77. Thus, the oil pressure exerted on the piston 77 by the centrifugal force in the oil chamber 79 is cancelled, thereby ensuring the control of the clutch torque in accordance with the clutch pressure.

Figure 3:
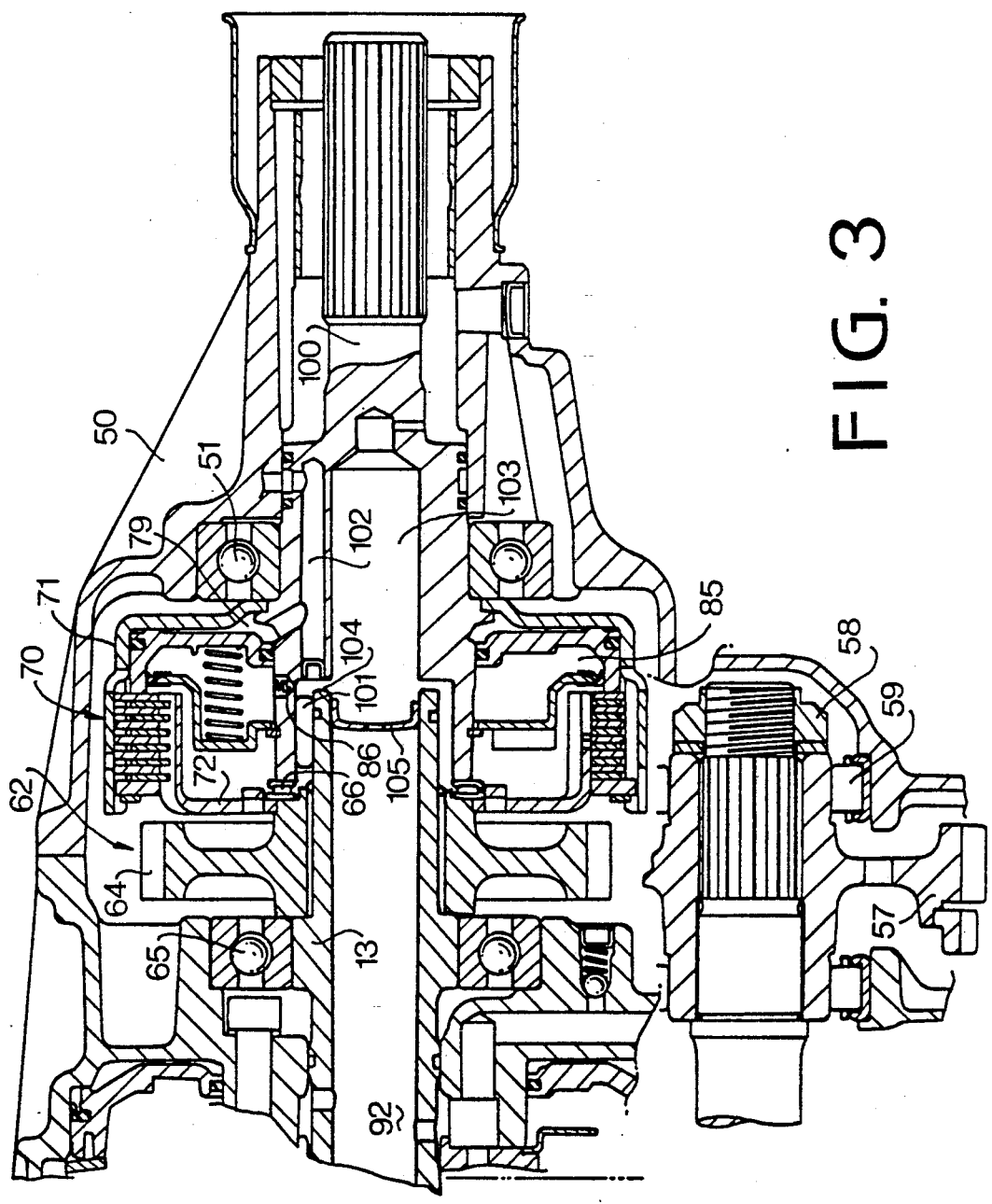
FIG. 3 is a sectional view showing a part of a system for a front-wheel drive based four-wheel drive vehicle.

Referring to FIG. 3 showing the system which is altered to the layout of the front-wheel drive based four-wheel drive vehicle, the output shaft 13 is rotatably supported in the transmission case 11 through the bearing 65. In the extension case 50, a rear drive shaft 100 is rotatably supported through the bearing 51. An end of the rear drive shaft 100 is rotatably mounted on the output shaft 13 through a needle bearing 101 and abuts against the reduction drive gear 64 through the thrust bearing 66. The drive gear 64 is secured to the output shaft 13 with splines. The drum 72 of the transfer clutch 70 is secured to the drive gear 64 at the hub thereof, and the drum 71 is secured to the rear drive shaft 100.

In the oil supply system, an oil passage 102 communicated with the oil chamber 79 is formed in the shaft 100. Further, the shaft 100 has an oil passage 103 communicated with the oil passage 92 through an orifice 105. The lubricating oil is fed to the bearings such as the needle bearing 101 through a junction between passages 92 and 103. The oil is supplied to the chamber 85 through a port 104 formed in the shaft 100 and to the clutch 70 through a gap between needle bearing 101 and a retainer of bearing 66.

Other structures are the same as the system of FIG. 1.

The engine power of the output shaft 13 is transmitted to the front wheels through the reduction drive gear 64, driven gear 57, and the front drive shaft 54. The engine power corresponding to the clutch torque of the clutch 70 is transmitted to the rear wheels, so that the four-wheel driving system is established.

Thus, in this embodiment, since the front wheels are directly connected to increase the torque distribution ratio to the front wheels, this structure is appropriate for the motor vehicle having a large front axle load distribution.

In accordance with the present invention, the engine and power trains layout are easily altered by changing only a part of components of the the drive line, that is the output shaft 13, the drive gear 64 and rear drive shaft 100. Since the transfer device can be altered to either of the front-wheel drive based system and the rear-wheel drive based system in accordance with the distribution of the front axle load and rear axle load, characteristics of the four-wheel drive motor vehicle are effectively improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A power transmission system for a four-wheel drive motor vehicle of a front-wheel drive based four-wheel vehicle having front and rear wheels of the vehicle and having a transmission disposed in a transmission case for transmitting power of an engine, a front differential disposed within said case for enabling differential operation between both of said front wheels, and a rear wheels power train connected to the rear wheels of the vehicle, the improvement of the system comprising:

a drive gear fixedly and coaxially secured on an output shaft of the transmission;

a driven gear engaged with the drive gear for transmitting a part of said power to said front wheels;

a front drive shaft disposed at a lower side of the transmission in the case for transmitting said part of the power from the drive gear to the front differential to drive the front wheels; and a fluid operated clutch coaxially disposed adjacent to a rear side of the drive gear and provided with a first drum and a second drum operatively engaged with each other by oil pressure, the first drum being secured to the drive gear whereby the clutch is mounted on the output shaft and the second drum being secured to a member of the rear wheels power train.

2. The system according to claim 1, wherein the fluid operated clutch is a fluid operated multiple-disk friction clutch.

3. In a power transmission system for a four wheel drive vehicle having a transmission disposed in a transmission case for transmitting from an output shaft of the transmission output torque from an engine, a front transmitting power train operatively connected to said transmission for transmitting a part of said output torque of the transmission to front wheels of the vehicle, a rear transmitting power train operatively connected to said transmission for transmitting another part of the output torque of the transmission to rear wheels of the vehicle, an extension case connected to a rear end of the transmission case and transfer clutch means disposed in the extension case for distributing the output torque of the transmission to the front transmitting power train and the rear transmitting power train, the improvement in the system comprising:

a first drum provided in the transfer clutch means and fixedly connected to the rear transmitting power train;

a second drum provided in the transfer clutch means and coaxially and operatively engaged with the first drum by oil pressure;

one of said drums being operatively secured to said output shaft;

a drive gear adjacent to the transmission and adjacent and coaxially fixed to the second drum between the transmission and the transfer clutch means and connected to the front transmitting power train so as to be compactly arranged in said transmission case; and said output shaft extends from the transmission; and said drive gear is secured to said output shaft to provide a front-wheel drive based four-wheel vehicle having a larger front axle load distribution to said front wheels than that to the rear wheels so as to perform optimum torque distribution.

4. In a power transmission system for a four wheel drive vehicle having a transmission disposed in a transmission case for transmitting from an output shaft of the transmission output torque from an engine, a front transmitting power train operatively connected to said transmission for transmitting a part of said output torque of the transmission to front wheels of the vehicle, a rear transmitting power train operatively connected to said transmission for transmitting another part of the output torque of the transmission to rear wheels of the vehicle, and transfer clutch means for distributing the output torque of the transmission to the front transmitting power train and the rear transmitting power train, the improvement in the system comprising:

a first drum provided in the transfer clutch means and fixedly connected to the rear transmitting power train;

a second drum provided in the transfer clutch means and coaxially and operatively engaged with the first drum by oil pressure;

one of said drums being operatively secured to said output shaft;

a drive gear adjacent and coaxially fixed to the second drum between the transmission and the transfer clutch means and connected to the front transmitting power train so as to be compactly arranged in said case; and said output shaft extends from the transmission; and said drive gear is secured to said output shaft to provide a front-wheel drive based four-wheel vehicle having a larger front axle load distribution to said front wheels than that to the rear wheels so as to perform optimum torque distribution.

* * * * *